US007984212B2

United States Patent
Pullagoundapatti et al.

(10) Patent No.: US 7,984,212 B2
(45) Date of Patent: Jul. 19, 2011

(54) SYSTEM AND METHOD FOR UTILIZING FIRST-IN-FIRST-OUT (FIFO) RESOURCES FOR HANDLING DIFFERENCES IN DATA RATES BETWEEN PERIPHERALS VIA A MERGE MODULE THAT MERGES FIFO CHANNELS

(75) Inventors: Sakthivel Komarasamy Pullagoundapatti, Karnataka (IN); Shrinivas Sureban, Karnataka (IN)

(73) Assignee: LSI Corporation, Milpitas, CA (US)

( * ) Notice: Subject to any disclaimer, the term of this patent is extended or adjusted under 35 U.S.C. 154(b) by 235 days.

(21) Appl. No.: 12/425,382

(22) Filed: Apr. 17, 2009

(65) Prior Publication Data

US 2010/0268854 A1    Oct. 21, 2010

(51) Int. Cl.
 G06F 5/16    (2006.01)
 G06F 13/00   (2006.01)

(52) U.S. Cl. .............. 710/53; 710/52; 710/54; 710/55; 710/56

(58) Field of Classification Search .............. 710/52–56
See application file for complete search history.

(56) References Cited

U.S. PATENT DOCUMENTS

| | | | | |
|---|---|---|---|---|
| 6,535,963 | B1 * | 3/2003 | Rivers | 711/149 |
| 6,683,552 | B2 * | 1/2004 | Noll et al. | 341/155 |
| 7,009,988 | B2 * | 3/2006 | Han et al. | 370/412 |
| 7,188,198 | B2 * | 3/2007 | Beukema et al. | 710/52 |
| 7,363,304 | B2 * | 4/2008 | Lewis et al. | 707/999.007 |
| 7,685,310 | B2 * | 3/2010 | Ueoka et al. | 709/241 |
| 7,706,361 | B2 * | 4/2010 | McMillen et al. | 370/388 |
| 7,711,006 | B2 * | 5/2010 | Dries et al. | 370/474 |
| 2006/0212872 | A1 * | 9/2006 | Raghunath et al. | 718/105 |
| 2007/0245043 | A1 * | 10/2007 | Wu | 710/52 |

* cited by examiner

*Primary Examiner* — Tammara Peyton

(74) *Attorney, Agent, or Firm* — Prakash Nama; Global IP Services, PLLC

(57) ABSTRACT

A system and method for sharing peripheral first-in-first-out (FIFO) resources is disclosed. In one embodiment, a system for utilizing peripheral FIFO resources includes a processor, a first peripheral FIFO controller and a second peripheral FIFO controller coupled to the processor for controlling buffering of first data and second data associated with the processor respectively. Further, the system includes a merge module coupled to the first peripheral FIFO controller and the second peripheral FIFO controller for merging a first FIFO channel associated with the first peripheral FIFO controller and a second FIFO channel associated with the second peripheral FIFO controller based on an operational state of the first FIFO channel and an operational state of the second FIFO channel respectively. Also, the system includes a first FIFO and a second FIFO coupled to the merge module via the first FIFO channel and the second FIFO channel respectively.

18 Claims, 3 Drawing Sheets

SYSTEM AND METHOD FOR UTILIZING FIRST-IN-FIRST-OUT (FIFO) RESOURCES FOR HANDLING DIFFERENCES IN DATA RATES BETWEEN PERIPHERALS VIA A MERGE MODULE THAT MERGES FIFO CHANNELS

FIELD OF TECHNOLOGY

Embodiments of the present invention relate to the field of electronics. More particularly, embodiments of the present invention relate to FIFO resources of on-chip devices.

BACKGROUND

A microprocessor may interface with one or more of peripheral devices using a peripheral controller which controls a flow of information between the microprocessor and the peripheral devices. Since there may be differences in data rates among the peripheral devices (e.g., between high end peripheral devices, such as a camera, a memory card, a display, etc., and low end peripheral devices, such as a universal asynchronous receiver/transmitter (UART), a synchronous serial protocol (SSP) device, etc.) as well as between the microprocessor and each peripheral device, a buffer, such as first-in-first-out (FIFO), may be used to compensate the data rate mismatch happening in each communication channel.

Thus, a FIFO may be allocated for each communication channel so that the microprocessor and the respective peripheral device can communicate with each other in spite of the mismatch in their data rates. During a transmit operation, the FIFO is used to temporarily store transmit data written by the microprocessor, where the transmit data may be read and transmitted by a peripheral FIFO controller to the respective peripheral device. Likewise, during a receive operation, the FIFO is used to temporarily store receive data from the peripheral device, where the receive data may be read and forwarded by the peripheral FIFO controller to the microprocessor.

However, due to the dedicated nature of the FIFO, the FIFO may be unused as long as the communication channel remains inactive. Furthermore, when there is a heavy traffic occurring for an active channel, the flow of information for the active channel may slow down as the size of the FIFO dedicated for the active channel may not be large enough to handle the heavy traffic while the FIFO for its neighboring inactive channel sits idle.

SUMMARY

A system and method for utilizing first-in-first-out (FIFO) resources is disclosed. In one aspect, a system includes a processor, a first peripheral FIFO controller coupled to the processor for controlling a buffering of first data associated with the processor, and a second peripheral FIFO controller coupled to the processor for controlling a buffering of second data associated with the processor.

Further, the system includes a merge module coupled to the first peripheral FIFO controller and the second peripheral FIFO controller for merging a first FIFO channel associated with the first peripheral FIFO controller and a second FIFO channel associated with the second peripheral FIFO controller based on an operational state of the first FIFO channel and an operational state of the second FIFO channel. In addition, the system includes a first FIFO coupled to the merge module via the first FIFO channel and a second FIFO coupled to the merge module via the second FIFO channel. Moreover, the system includes a switch module for controlling the merge module based on the operational state of the first FIFO channel and the operational state of the second FIFO channel.

In another aspect, a system on chip (SOC) device includes a processor, a plurality of peripheral FIFO controllers coupled to the processor for controlling bufferings of data associated with the processor. Further, the SOC device includes a merge module coupled to the plurality of FIFO controllers for merging a plurality of FIFO channels associated with the plurality of peripheral FIFO controllers based on operational states of the plurality of FIFO channels, and a plurality of FIFOs coupled to the merge module via the plurality of FIFO channels. Additionally, the SOC device includes a switch module for controlling the merge module based on the operational states of the plurality of FIFO channels.

In yet another aspect, a method for utilizing peripheral FIFO resources associated with a FIFO system with two FIFO channels having instructions that, when executed by a computer, cause the computer to perform the method that includes monitoring an operational state of a first FIFO channel associated with a first peripheral FIFO controller and an operational state of a second FIFO channel associated with a second peripheral FIFO controller. The method further includes merging the first FIFO channel coupled to a first FIFO and the second FIFO channel coupled to a second FIFO if only one of the first FIFO channel and the second FIFO channel is an active FIFO channel, and performing a FIFO operation using the active FIFO channel.

Other features of the present embodiments will be apparent from the accompanying drawings and from the detailed description that follows.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for utilizing first-in-first-out (FIFO) resources is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
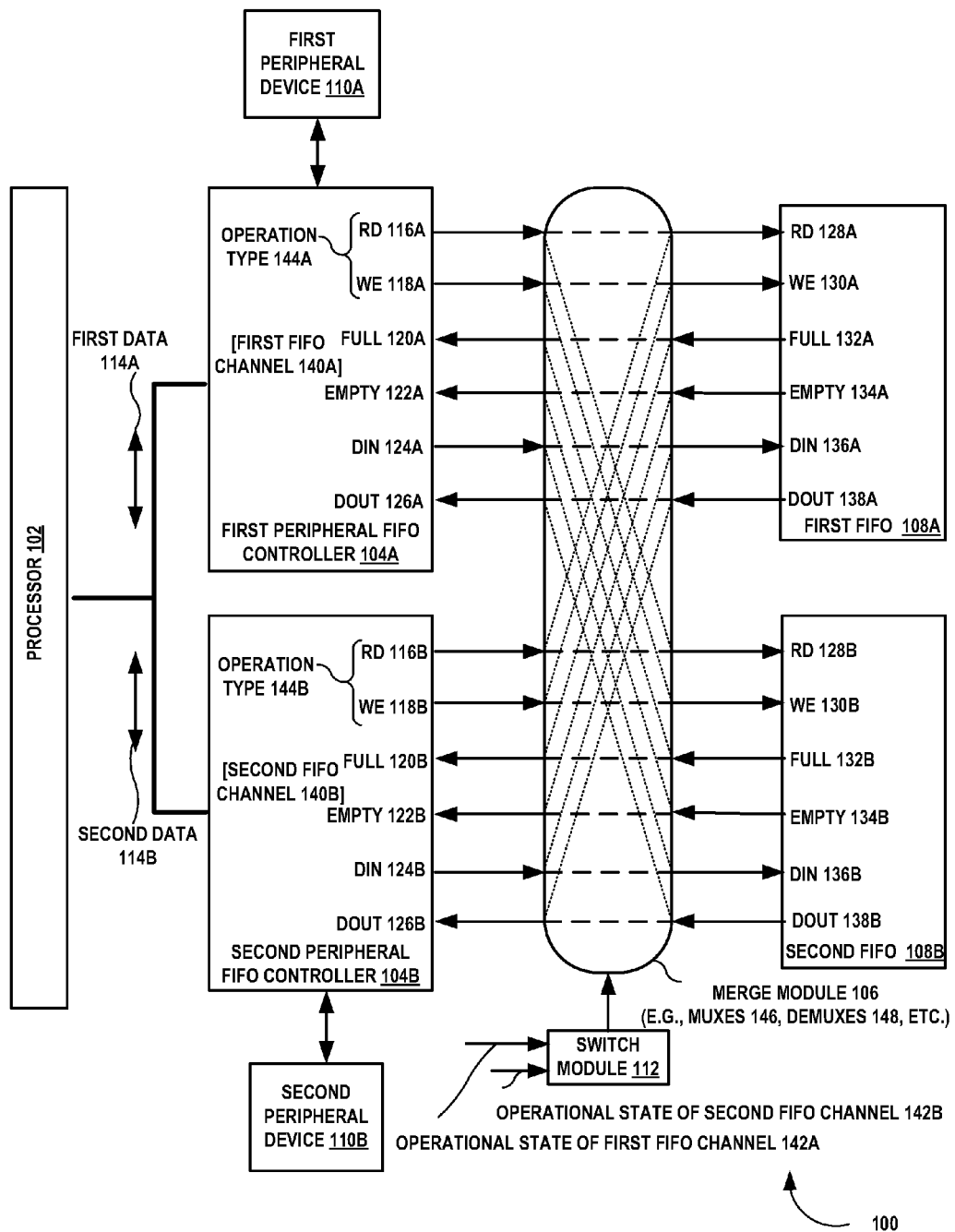
FIG. 1 illustrates a block diagram of an exemplary system for sharing peripheral first-in-first-out (FIFO) resources, according to one embodiment.

FIG. 1 illustrates a block diagram of an exemplary system 100 for sharing peripheral FIFO resources, according to one embodiment. The system 100 includes a processor 102, a first peripheral FIFO controller 104A and a second peripheral FIFO controller 104B coupled to the processor 102. Further, the system 100 includes a merge module 106 (e.g., including multiplexers 146, demultiplexers 148, etc.) coupled to the first peripheral FIFO controller 104A and the second peripheral FIFO controller 104B.

Furthermore, the system 100 includes a first FIFO 108A and a second FIFO 108B coupled to the merge module 106 via a first FIFO channel 140A and a second FIFO channel 140B, respectively. In one embodiment, the first FIFO channel 140A and the second FIFO channel 140B are of a same type (e.g., both FIFO channels operate in a transmit mode and receive mode). In another embodiment, the first FIFO channel 140A and the second FIFO channel 140B are of different types (e.g., one FIFO channel operates in a transmit mode while another operates in a receive mode). In addition, the system 100 includes a switch 112 operatively coupled to the merge module 106. Moreover, each of the first peripheral FIFO controller 104A and the second peripheral FIFO controller 104B is coupled to a first peripheral device 110A and a second peripheral device 110B respectively.

In operation, the first peripheral FIFO controller 104A and the second peripheral FIFO controller 104B controls bufferings of first data 114A and second data 114B respectively. It is appreciated that the bufferings of the first data 114A and the second data 114B may be performed for a write operation from the processor 102 to the first peripheral device 110A and/or the second peripheral device 110B. It is also appreciated that the bufferings of the first data 114A and the second data 114B may be performed for a write operation from the first peripheral device 110A and/or the second peripheral device 110B to the processor 102 (e.g., or a read operation in the perspective of the processor 102). In one embodiment, the merge module 106 merges the first FIFO channel 140A associated with the first peripheral FIFO controller 104A and the second FIFO channel 140B associated with the second peripheral FIFO controller 104B based on an operational state of first FIFO channel 142A and an operational state of second FIFO channel 142B. In this embodiment, the switch module 112 controls the merge module 106 based on the operational state of first FIFO channel 142A and the operational state of second FIFO channel 142B.

In one exemplary implementation, the operational state of first FIFO channel 142A and the operational state of second FIFO channel 142B is determined based on an operation type 144A associated with the first FIFO channel 140A and an operation type 144B associated with the second FIFO channel 140B respectively. For example, the operation type 144A associated with the first FIFO channel 140A is indicated by a read enable signal (RD) 116A and a write enable signal (WE) 118A and the operation type 144B associated with the second FIFO channel 140B is indicated by a read enable signal (RD) 116B and a write enable signal (WE) 118B.

In one embodiment, the merge module 106 is operable to maintain the first FIFO channel 140A and the second FIFO channel 140B independent from each other if each of the first FIFO channel 140A and the second FIFO channel 140B is active. In another embodiment, the merge module 106 is operable to add the second FIFO 108B to the first FIFO channel 140A if the first FIFO channel 140A is active and the second FIFO channel 140B is idle. In this embodiment, a write operation to the second FIFO 108B is performed via the first FIFO channel 140A if the first FIFO 108A is full. As illustrated, the status of the first FIFO 108A is indicated either by a FIFO full signal (FULL) 132A or an FIFO empty signal (EMPTY) 134A.

In yet another embodiment, the merge module 106 is operable to add the first FIFO 108A to the second channel 140B if the second FIFO channel 140B is active and the first FIFO channel 140A is idle. In this embodiment, a write operation to the first FIFO 108A is performed via the second FIFO channel 140B if the second FIFO 108B is full. As illustrated, the status of the second FIFO 108B is indicated either by a FIFO full signal (FULL) 132B or an FIFO empty signal (EMPTY) 134B. Further, when both the first FIFO 108A and the second FIFO 108B are full, the FIFO full is asserted.

For example, consider that the first peripheral FIFO controller 104A is used to transmit 1 MB of image data to the first peripheral device 110A using the first FIFO channel 140A which is active. Also, consider that, during the transmit operation; the second FIFO channel 140B is idle. Suppose, if the system 100 is programmed to initiate 256 bytes burst, the system 100 can transmit 1 MB of image data in 4096 bursts transfers using only the first FIFO channel 140A. However, the system 100 can be configured to initiate 512 bytes burst and entire 1 MB of image data can be transmitted in 2048 bursts transfers by adding the second FIFO 108B to the first FIFO channel 140A. In other words, by adding the second FIFO 108B to the first FIFO channel 140A, the FIFO space is increased to 2N from N, where N is a storage capacity of the first FIFO 108A. This helps reduce a lot of bus traffic in terms of bus arbitration.

Figure 2:
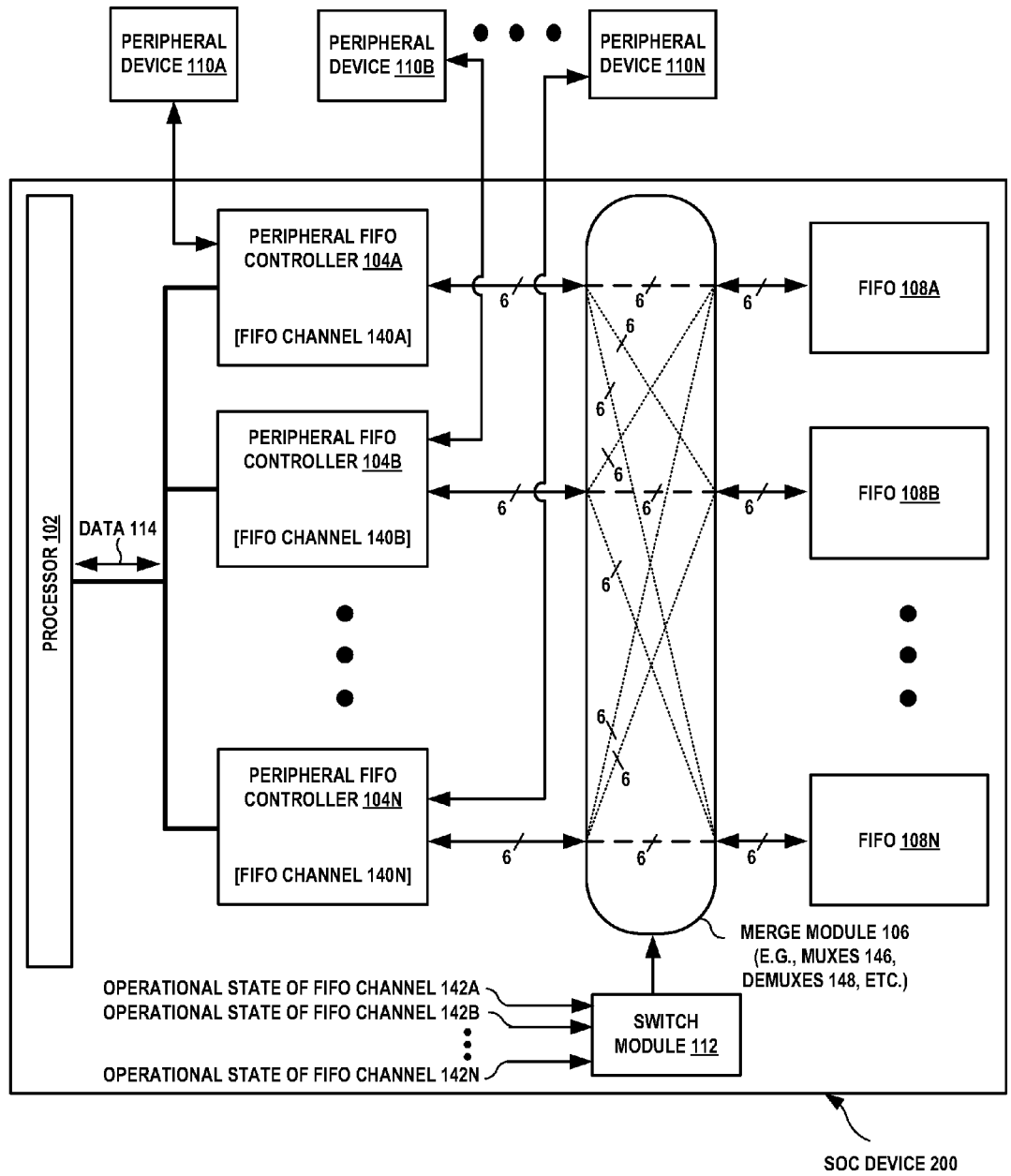
FIG. 2 illustrates a block diagram of an exemplary system on chip (SOC) device based on the system for sharing peripheral FIFO resources in FIG. 1, according to one embodiment.

FIG. 2 illustrates a block diagram of an exemplary system on chip (SOC) device 200 based on the system 100 for sharing peripheral FIFO resources in FIG. 1, according to one embodiment. The SOC device 200 includes a processor 102, a plurality of peripheral FIFO controllers 104A through N coupled to the processor 102. Further, SOC device 200 includes a merge module 106 coupled to the plurality of peripheral FIFO controllers 104A through N. For example, the merge module 106 may include multiplexers 146 and demultiplexers 148. Also, the SOC device 200 includes a plurality of FIFOs 108A through N coupled to the merge module 106 via a plurality of FIFO channels 140A through N. Moreover, each of the plurality of peripheral FIFO controllers 104A through N is coupled to respective one of peripheral devices 110A through N.

In the SOC device 200, the plurality of peripheral FIFO controllers 104A through N controls bufferings of data 114 associated with the processor 102. Further, the merge module 106 merges the plurality of FIFO channels 140A through N associated with the plurality of peripheral FIFO controllers 104A through N based on operational states 142A through N of the plurality of FIFO channels 140A through N.

In one exemplary implementation, the operational states of the plurality of FIFO channels 140A through N are determined based on a type of operation associated with each one of the plurality of FIFO channels 140A through N. In accordance with the above described embodiments, a switch module 112 controls the merge module 106 based on the operational states 142A through N of the plurality of FIFO channels 140A through N.

Figure 3:
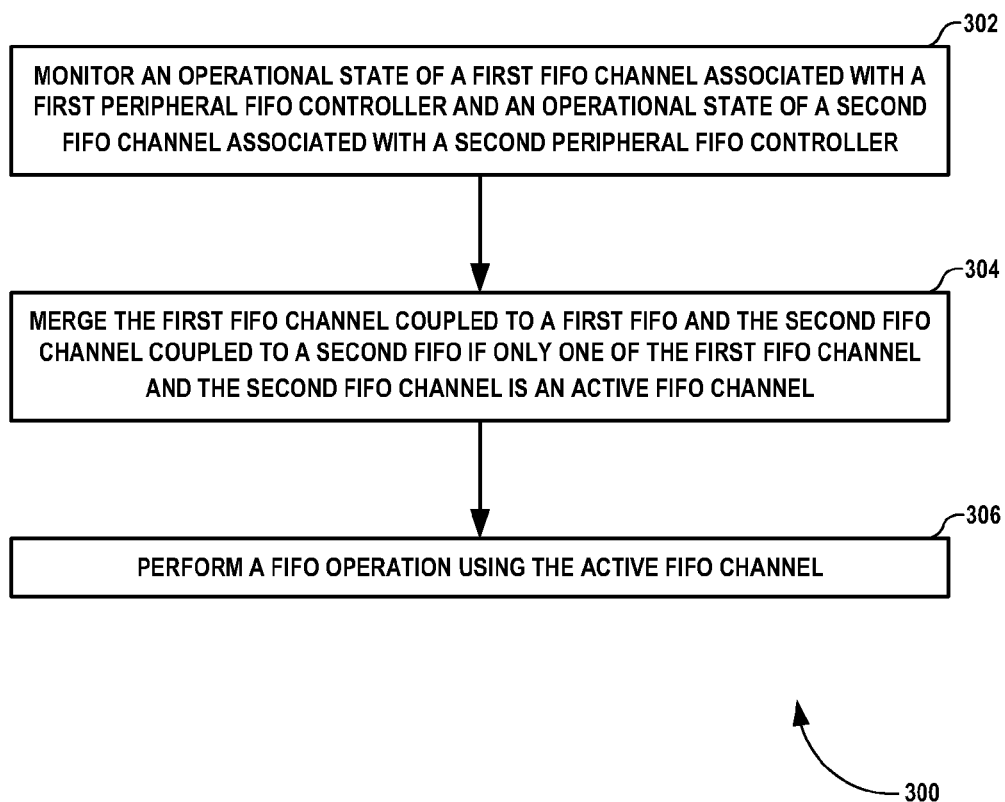
FIG. 3 illustrates a process flow chart of an exemplary method for sharing peripheral FIFO resources, according to one embodiment.

FIG. 3 illustrates a process flow chart 300 of an exemplary method for sharing peripheral FIFO resources, according to one embodiment. In operation 302, an operational state of a first FIFO channel associated with a first peripheral FIFO controller and an operational state of a second FIFO channel associated with a second peripheral FIFO controller are monitored. In one embodiment, the operational state of the first FIFO channel and the operational state of the second FIFO channel are monitored based on a write enable signal, a read enable signal, a FIFO empty signal and/or a FIFO full signal.

In operation 304, the first FIFO channel coupled to a first FIFO and the second FIFO channel coupled to the second FIFO are merged if only one of the first FIFO channel and the second FIFO channel is an active FIFO channel. In operation 306, a FIFO operation is performed using the active FIFO channel. In one embodiment, both the first FIFO and the second FIFO are utilized for the FIFO operation via the active FIFO channel. Moreover, in one example embodiment, a FIFO system with two FIFO channels for sharing peripheral FIFO resources, has instructions that, when executed by a computer, cause the computer to perform the method of FIG. 3.

The above-described systems and methods facilitate efficient utilization of peripheral FIFO resources using a merge module (e.g., a glue logic). In one embodiment, the above-described systems and methods facilitate merging of two or more FIFO channels based on operating states of FIFO channels. Thus, time taken to perform a number of transactions is significantly reduced.

The above-described technique facilitates software programmers to have full control for dynamically allocating/deallocating the peripheral FIFO resources based on application requirements. Further, the above-described technique can be implemented in a SOC design without having significant impact on a number of gate counts. Further, the above-described technique ensures reduction in bus traffic in terms of bus arbitration. Also, switching on the bus is reduced and saving in dynamic power by considerable amount is possible in cases where burst transfers addresses are not changed.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A system for utilizing peripheral first-in-first-out (FIFO) resources, comprising:
    a processor;
    a first peripheral FIFO controller coupled to the processor and a first peripheral device for controlling a buffering of first data associated with the processor;
    a second peripheral FIFO controller coupled to the processor and a second peripheral device for controlling a buffering of second data associated with the processor;
    a merge module coupled to the first peripheral FIFO controller and the second peripheral FIFO controller;
    a first FIFO coupled to the merge module via a first FIFO channel; and
    a second FIFO coupled to the merge module via a second FIFO channel, wherein the merge module merges the first FIFO channel associated with the first peripheral FIFO controller and the second FIFO channel associated with the second peripheral FIFO controller based on an operational state of the first FIFO channel and an operational state of the second FIFO channel, and wherein the merge module merges the first FIFO channel and the second FIFO channel if only one of the first FIFO channel and the second FIFO channel is an active FIFO channel.

2. The system of claim 1, wherein the operational state of the first FIFO channel is determined based on an operation type associated with the first FIFO channel and wherein the operational state of the second FIFO channel is determined based on an operation type associated with the second FIFO channel.

3. The system of claim 2, further comprising a switch module for controlling the merge module based on the operational state of the first FIFO channel and the operational state of the second FIFO channel.

4. The system of claim 1, wherein the merge module is operable to maintain the first FIFO channel and the second FIFO channel independent from each other if each of the first FIFO channel and the second FIFO channel is active.

5. The system of claim 1, wherein the merge module is operable to add the second FIFO to the first FIFO channel if the first FIFO channel is active and the second FIFO channel is idle.

6. The system of claim 5, wherein a write operation to the second FIFO is performed via the first FIFO channel if the first FIFO is full.

7. The system of claim 1, wherein the merge module is operable to add the first FIFO to the second FIFO channel if the second FIFO channel is active and the first FIFO channel is idle.

8. The system of claim 7, wherein a write operation to the first FIFO is performed via the second FIFO channel if the second FIFO is full.

9. The system of claim 1, wherein the merge module comprises a plurality of multiplexers and de-multiplexers.

10. The system of claim 1, wherein the first FIFO channel and the second FIFO channel are of a same type.

11. The system of claim 1, wherein the first FIFO channel and the second FIFO channel are of different types.

12. A system on chip device (SOC), comprising:
    a processor;
        a plurality of peripheral FIFO controllers coupled to the processor and a respective one of a plurality of peripheral devices for controlling bufferings of data associated with the processor;
        a merge module coupled to the plurality of FIFO controllers; and
        a plurality of FIFOs coupled to the merge module via a plurality of FIFO channels, wherein the merge module merges the plurality of FIFO channels associated with the plurality of peripheral FIFO controllers based on operational states of the plurality of FIFO channels, wherein the plurality of FIFO channels includes a first FIFO channel and a second FIFO channel, and wherein the merge module merges the first FIFO channel and the second FIFO channel if only one of the first FIFO channel and the second FIFO channel is an active FIFO channel.

13. The device of claim 12, wherein the operational states of the plurality of FIFO channels are determined based on a type of operation associated with each one of the plurality of FIFO channels.

14. The device of claim 12, further comprising a switch module for controlling the merge module based on the operational states of the plurality of FIFO channels.

15. The device of claim 12, wherein the merge module comprises a plurality of multiplexers and de-multiplexers.

16. A method for utilizing peripheral FIFO resources associated with a FIFO system with two FIFO channels, the method comprising:

monitoring an operational state of a first FIFO channel associated with a first peripheral FIFO controller and an operational state of a second FIFO channel associated with a second peripheral FIFO controller, wherein the first peripheral FIFO controller is coupled to a first peripheral device and the second peripheral FIFO controller is coupled to a second peripheral device;

merging the first FIFO channel coupled to a first FIFO and the second FIFO channel coupled to a second FIFO if only one of the first FIFO channel and the second FIFO channel is an active FIFO channel; and performing a FIFO operation using the active FIFO channel.

17. The method of claim 16, wherein the monitoring the operational state of the first FIFO channel and the operational state of the second FIFO channel is based on at least one of: a write enable signal; a read enable signal; a FIFO empty signal; and a FIFO full signal.

18. The method of claim 16, wherein the merging the first FIFO channel and the second FIFO channel comprises utilizing both the first FIFO and the second FIFO for the FIFO operation via the active FIFO channel.

* * * * *